United States Patent [19]

Linscheid et al.

[11] Patent Number: 5,628,608
[45] Date of Patent: *May 13, 1997

[54] GRAIN CART

[75] Inventors: Craig W. Linscheid; Daniel Dold, both of Claremore, Okla.

[73] Assignee: Parham Industries

[*] Notice: The term of this patent shall not extend beyond the expiration date of Pat. No. 5,516,253.

[21] Appl. No.: 580,138

[22] Filed: Dec. 28, 1995

Related U.S. Application Data

[62] Division of Ser. No. 370,014, Jan. 9, 1995, Pat. No. 5,516,253.

[51] Int. Cl.$^6$ ........................................ B60P 1/40
[52] U.S. Cl. .................... 414/526; 74/665 B; 198/674; 474/150
[58] Field of Search ........................ 414/526, 523, 414/519, 520, 326, 505, 528; 198/311, 674; 74/665 B; 474/148, 150, 273

[56] References Cited

U.S. PATENT DOCUMENTS

| | | | |
|---|---|---|---|
| 2,778,509 | 1/1957 | Donsbach, Jr. | 198/311 X |
| 2,834,451 | 5/1958 | Turner | 198/311 |
| 3,220,740 | 11/1965 | Kavan et al. | 414/526 X |
| 4,274,790 | 6/1981 | Barker | 414/502 |
| 4,484,606 | 11/1984 | Kosters | 414/526 X |
| 4,603,775 | 8/1986 | Plett | 198/311 X |
| 4,846,621 | 7/1989 | Warsaw | 414/526 |
| 4,923,358 | 5/1990 | Van Mill | 414/519 |
| 4,963,066 | 10/1990 | Boppart | 198/311 X |
| 5,013,208 | 5/1991 | Grieshop | 414/526 |
| 5,184,712 | 2/1993 | Feterl | 198/311 X |
| 5,305,866 | 4/1994 | Stewart et al. | 198/311 |
| 5,516,253 | 5/1996 | Linscheid et al. | 414/526 X |

FOREIGN PATENT DOCUMENTS 1818992 9/1960 Germany.

Primary Examiner—David A. Bucci
Attorney, Agent, or Firm—Head, Johnson & Kachigian

[57] ABSTRACT

An improved harvesting cart having a drive assembly for providing easy transition between PTO drive and hydraulic drive is disclosed. The harvesting cart has a drive shaft for engaging an auger flighting or other unloading mechanism. A forward end of the drive shaft is adapted to receive a complementary PTO coupling from a pulling vehicle. The drive assembly comprises a first sprocket positioned upon the drive shaft at a generally forward location, a hydraulic motor mounted adjacent to the drive shaft and having an output shaft extending parallel to the drive shaft, and a second sprocket positioned upon the output shaft of the hydraulic motor so as to be aligned in a working relationship to the first sprocket, such that the drive shaft may be either hydraulically-driven by the hydraulic motor via a chain operatively connecting the first sprocket with the second sprocket or PTO-driven by the pulling vehicle via the PTO coupling, the chain being easily installed and removed from about the first sprocket and the second sprocket by slightly adjusting the mounted position of the hydraulic motor so as to give slack to the chain.

12 Claims, 9 Drawing Sheets

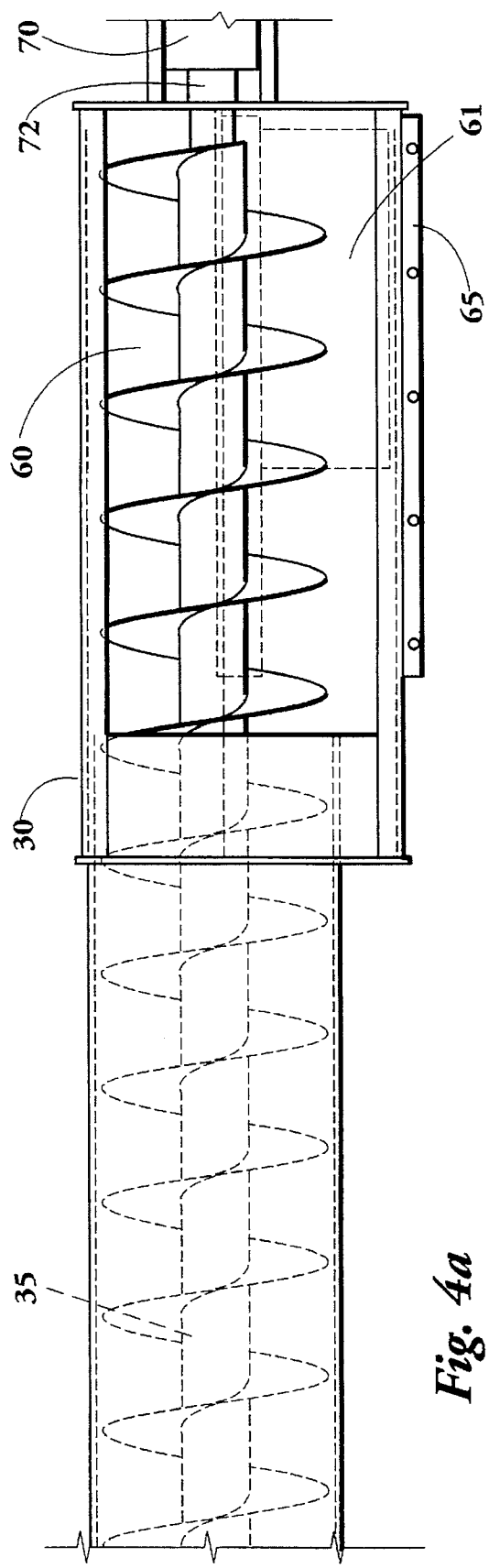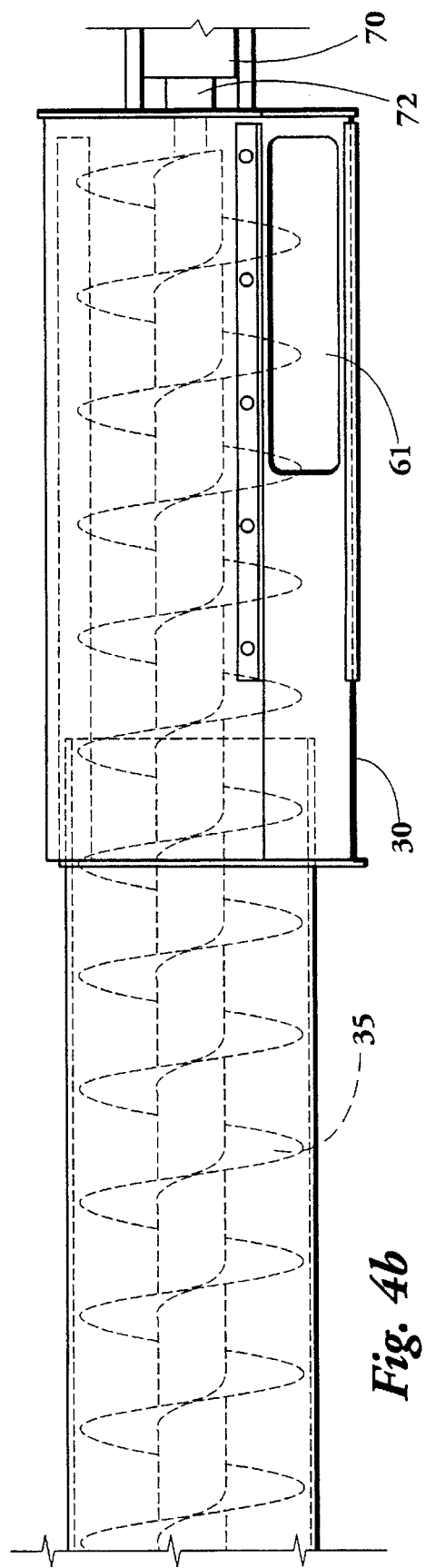
Fig. 4a
Fig. 4b

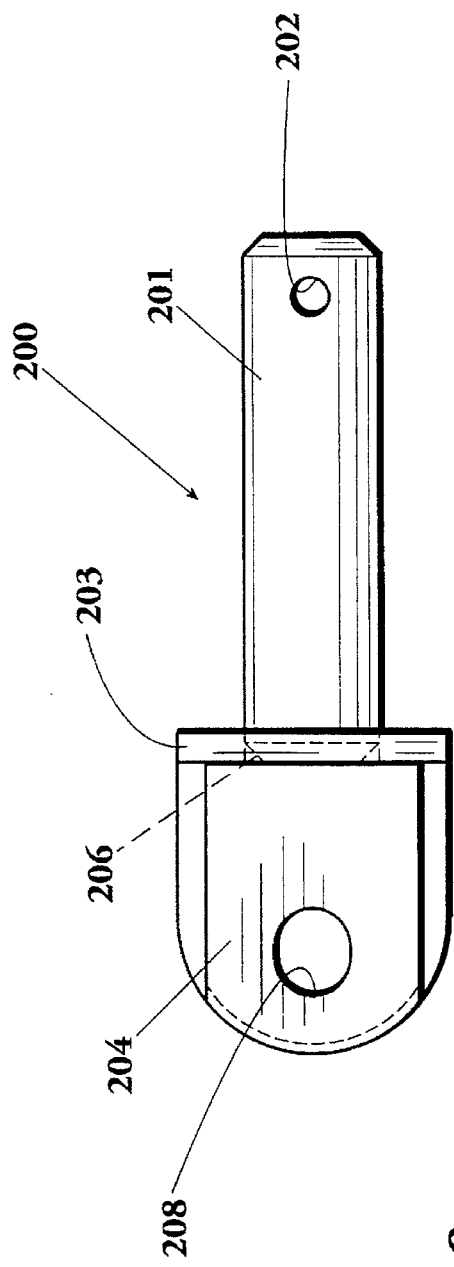
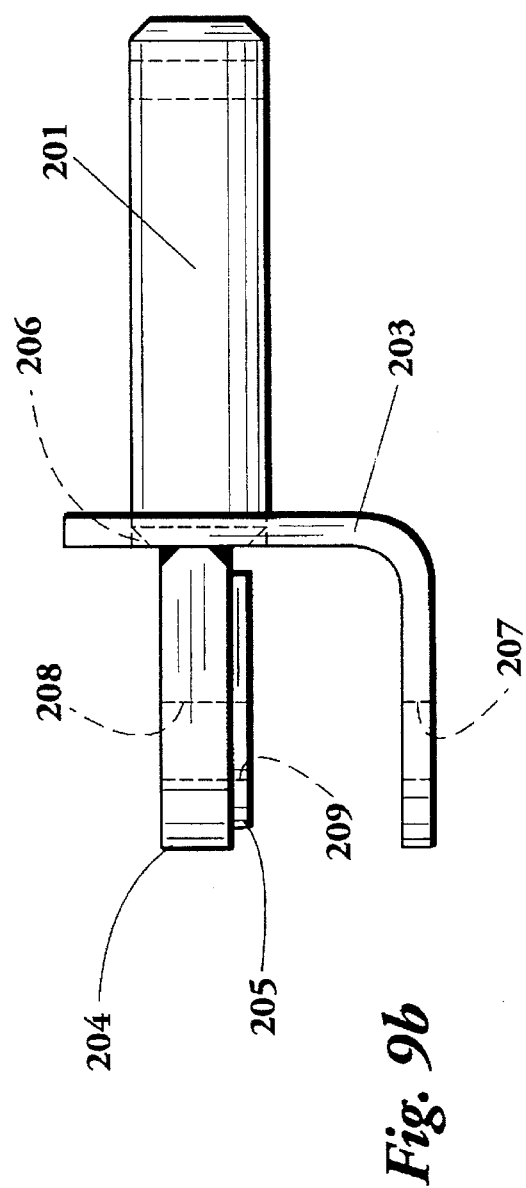
Fig. 9a
Fig. 9b

GRAIN CART

This application is a divisional of application Ser. No. 08/370,014 filed on Jan. 9, 1995, now U.S. Pat. No. 5,516,253.

FIELD OF THE INVENTION

The present invention relates to grain carts or wagons, and, more specifically, to a grain cart having an improved hopper and auger mechanism for better grain flow control and a novel drive line arrangement and hitch assembly for ease of operation.

BACKGROUND OF THE INVENTION

The purpose of grain carts is to improve the efficiency of harvesting equipment such as combines, thereby shortening harvest time. While modern combines are fast and efficient, problem occur in transporting the grain away from the combine and out of the field.

Anytime the combine is stopped for unloading, valuable cutting time is lost—up to one-third of the machine's total capacity. This translates quickly into dollars lost. When a large combine is working in a 150 bushel per acre corn field, it can produce approximately 2,700 bushels per hour. But if required to stop and unload, this potential can be cut to as little as 1,688 bushels hourly. The loss of 1,000+ bushels of production per hour will multiply to a staggering 10,000 bushel loss in a ten hour workday. This problem of lost production is even more significant when smaller combines are used.

Loss of combine production is not the only difficulty faced by the farmer during harvest. Large trucks are sometimes used to transport grain from the field, but they often do not perform well in muddy or rough field conditions. Furthermore, in wheat country, a truck in the field can easily spark a catastrophic fire.

Grain cans are a solution to these problems. Grain cans usually comprise a grain hopper or box sitting atop a wheeled frame, in combination with an auger means or mechanism for unloading grain from the hopper. Productivity rises dramatically with the use of grain carts because combines need never stop to unload. Rather, grain from the combine bin is unloaded into the grain cart on the go. Moreover, a single grain cart can usually service one or more combines, first unloading one, then another, and transporting the harvested grain to a waiting truck whenever necessary. Grain carts also handle soft or rough fields with ease, and, since they are pulled behind a tractor, fire hazards are eliminated.

Because they offer a combination of economy, versatility, production savings, and maneuverability, grain cans have been widely accepted by the farmer and widely produced by equipment manufacturers. Yet there remain troublesome obstacles to overcome in grain can construction. It is the purpose of the present invention to surmount these obstacles.

One problem commonly encountered by grain can operators is a difficulty in visually determining the position of the auger mechanism. Most grain cans have auger mechanisms that include a folding grain conduit. Determining the position of the grain conduit is important in preventing damage to the conduit and hopper. The grain conduit is normally folded and unfolded a number of times a day. If the tractor operator cannot determine the position of the grain conduit from the driver's seat, he must jump off and on the tractor to check the conduit's position, wasting time and risking injury. Attempts have been made to solve this problem on cans that have augers that fold down the side of the hopper through the use of auger position indicators, but these indicators may fail and can be difficult to see due to dirt or wear.

Another common problem with grain carts is that the grain conduit protrudes, when in the folded, transport position, past the rear of the hopper. This creates a driving hazard, both for the tractor operator and road and highway users, and increases the chance of damaging the auger mechanism when the cart is maneuvered in fight areas.

The prior devices also have auger mechanisms that extend through a wall of the hopper such that there is auger structure contained inside the grain hopper. This internal auger structure can significantly impair grain removal from the hopper by hindering downward grain flow, by leaking grain into the sump causing a high start-up torque, and by lessening the depth of the hopper sump area. The auger mechanism may also include hydraulic cylinders and the like which leak and contaminate the grain. The fact that these mechanisms are located within the hopper makes routine maintenance more difficult, and, in the case of a hydraulic failure of the shut off mechanism when the cart is loaded, it is impossible to unload the cart with the auger.

Two types of drive systems are used in today's carts—PTO, or power take-off, and hydraulic drives. A problem arises if it is desired to change between the two, such as due to tractor failure. If, for example, a grain cart was last used with a PTO mechanism, to change to hydraulic drive the operator would be required to crawl under the cart to disengage the cart's PTO drive mechanism from the auger gear box and install a hydraulic drive. The same is true to go from hydraulic drive back to PTO. This, of course, is very time consuming. Still further, some systems do not provide a type of drive system that allows the operator to easily vary the rotational velocity of the unloading auger.

Along the same line, problems are often encountered in coupling grain carts and other implements to tractors and pulling vehicles. Normally an implement will have a single tang hitch or a clevis hitch for connection to the tractor. If the implement hitch is not complementary to the tractor hitch, either the implement hitch or the tractor hitch must be removed and replaced before hook-up.

SUMMARY OF THE INVENTION

It is therefore an object of the present invention to provide an improved grain cart having a hopper with walls that are inset and formed around an auger means so that the hopper is devoid of internal auger structure, thereby providing clean gain flow lines and a deeper bottom to facilitate gain removal and clean-out.

An additional object of Applicant's invention is to supply an auger means for a gain cart, the auger means having a gain shut off door and related mechanisms positioned outside the hopper so that the door is less prone to leakage and is easily serviced.

It is another an object of the invention to provide an improved gain can having an auger means positioned in a front corner of the can in a manner so as to provide the tractor operator with visibility of a gain conduit flange from which the operator can easily determine conduit position.

It is a further object of the invention to provide a gain can with an auger means having a grain conduit engineered such that, while there is sufficient conduit length, the conduit does not protrude past the rear of the hopper when in the transport position.

A still further object of the invention is to provide an optional drive line arrangement for a grain cart whereby the cart can be quickly convened between PTO drive and hydraulic drive configurations. A related object is to provide a drive line assembly whereby the rotational velocity of the auger system can be varied, Another object of the invention is to furnish a universal, combined single tang and clevis hitch which will allow the improved grain cart and other implements to be coupled to a tractor without regard to the type of hitch mounted on the tractor.

These and other objects and advantages are provided by the improved grain can. The invention includes a mobile frame adapted to be pulled by a vehicle, such as a tractor. The frame supports a grain hopper or box. The hopper has an inset front corner area formed by the hopper walls. An auger means is provided for unloading grain from the hopper, the auger means being entirely located outside the hopper. The auger means includes a sump for receiving grain from the hopper, the sump being positioned on a lower, outside wall portion of the inset front corner area. Between the sump and the surface of the outside wall portion of the inset front corner area there is a grain shut off door for controlling a flow of grain from the hopper to the sump. A hydraulic cylinder is mounted adjacent to the sump outside the hopper and is connected to the grain shut off door for opening and closing the door. A conduit is connected to the sump, and a means is supplied for conveying grain through the conduit.

In accordance with other aspects of the invention, the improved grain cart includes a grain hopper having an open, rectangular top and inner surfaces that slope convergingly toward the hopper bottom. The hopper also has an inset front corner area formed by the hopper walls whose inner surfaces also slope toward the hopper bottom. The auger means for unloading grain from the hopper is located entirely outside the hopper and is inclined about 50° with respect to the cart frame. The grain conduit includes a lower auger tube connected to the sump at its first end and having a flange at its second end and an upper auger tube having a flange at its first end complementary to that of the lower auger tube. The augers and flanges are positioned such that an operator may visually inspect the upper auger tube flange from the tractor seat to determine the position of the upper auger tube in relation to the hopper.

Another aspect of the invention is a drive assembly for conveying grain through the grain conduit. The drive assembly includes a gear box adapted to connect to auger fighting disposed inside the conduit, and a drive shaft of a length sufficient to extend forward of the front of the hopper for engaging the gear box. The drive shaft can be fined with one or more sprockets and is further adapted to receive a complemtenary PTO coupling. A hydraulic motor having one or more sprockets aligned in a working relationship to the drive shaft sprockets may be furnished such that the drive shaft can be either hydraulically-driven by a chain connecting the drive shaft sprockets with the motor sprockets or PTO-driven. The optional hydraulic motor is adjustably mounted such that the size of the sprockets and the chain may be changed to vary the rotational velocity of the flighting. The sump may also be provided with a pit dump door.

Still another aspect of the invention is the hitch assembly, which includes a shaft and two hitch pieces. A first hitch piece is connected to the shaft, the first hitch piece having a vertical portion for mating with the shaft and a horizontal portion having a linkage hole therethrough. A second hitch piece is positioned above and parallel to the horizontal portion of the first hitch piece such that there is a space between the second hitch piece and the horizontal portion of the first hitch piece, the second hitch piece having a linkage hole therethrough aligned with the linkage hole of the first hitch piece.

The novel design of the improved grain cart leads to numerous advantages. Many benefits arise from the location of the auger means in an inset front corner area of the hopper. Since the auger is positioned in the corner of the cart, and because the auger flanges are visible, the cart operator, i.e. the tractor driver, can visually inspect the upper auger tube flange from the tractor seat to determine the auger tube position. Thus, as opposed to not being able to see the upper auger tube or relying on a faulty or partially obscured position indicator, the operator can confidently rely upon a visual inspection without having to leave the tractor. This prevents damage to the upper auger system during folding and transporting.

The placement of the auger means in a front corner of the cart also allows for sufficient auger length without having to extend the upper auger tube past the rear of the cart when in its folded position. Overall cart width is optimized as the upper auger tube is stored within the plan lines of the cart. Transport hazards are consequently minimized.

Providing the hopper with an inset front corner area facilitates moving the auger means outside the hopper and simultaneously creates a deeper hopper bottom, promoting grain flow. Because the auger means is located outside the hopper, maintainability is improved. Construction methods are also simplified as the grain shut off door is constructed to slide along an outside wall panel of the hopper. Due to this construction, the grain shut off door has less of a tendency to leak than conventional systems. It can also be easily serviced from the outside of the hopper should a problem arise. Still further, since the hydraulic cylinder that acts on the grain shut off door is placed adjacent to the sump, instead of inside the hopper, contamination of grain by hydraulic fluid is avoided.

Another significant advantage to the invention is that grain flow inside the hopper is unobstructed. Since a front corner of the cart is inset to form around the outside auger means, the inside of the hopper remains free of obstructions common to prior art machines. The inside of the hopper is thus smoother and cleaner, allowing for better grain flow and easier hopper clean-out.

Additional benefits are provided by the novel drive line arrangement, which aids the operator in quickly switching between a PTO-driven auger means and a hydraulically-driven auger means. Instead of crawling under the hopper to connect and disconnect drive mechanisms, the operator of the invention can easily change over from one drive mechanism to the other by making simple adjustments to a drive line assembly located forward of the hopper on the cart frame. As the drive line arrangement includes a common, sprocketed drive shaft for PTO and hydraulic operation, the only conversion changes needed are installing (or removing) a chain and removing (or installing) a PTO coupling. Moreover, the rotational velocity of the anger righting can be increased or decreased by changing the size of the sprockets to minimize cart unloading time.

The universal hitch also saves time and money by eliminating hitch replacements and change-overs.

A better understanding of the invention, and these and other objects and advantages, will be obtained from the following description, taken in conjunction with the claims and attached drawings.

BRIEF DESCRIPTION OF THE DRAWINGS

FIG. 4a is a top view of the lower auger tube and sump components of the invention before installation, and FIG. 4b is a left side view of the same components.

FIG. 9a is a top view of the hitch assembly.

FIG. 9b is a side view of the hitch assembly.

DETAIL DESCRIPTION OF THE PREFERRED EMBODIMENTS

Figure 1:
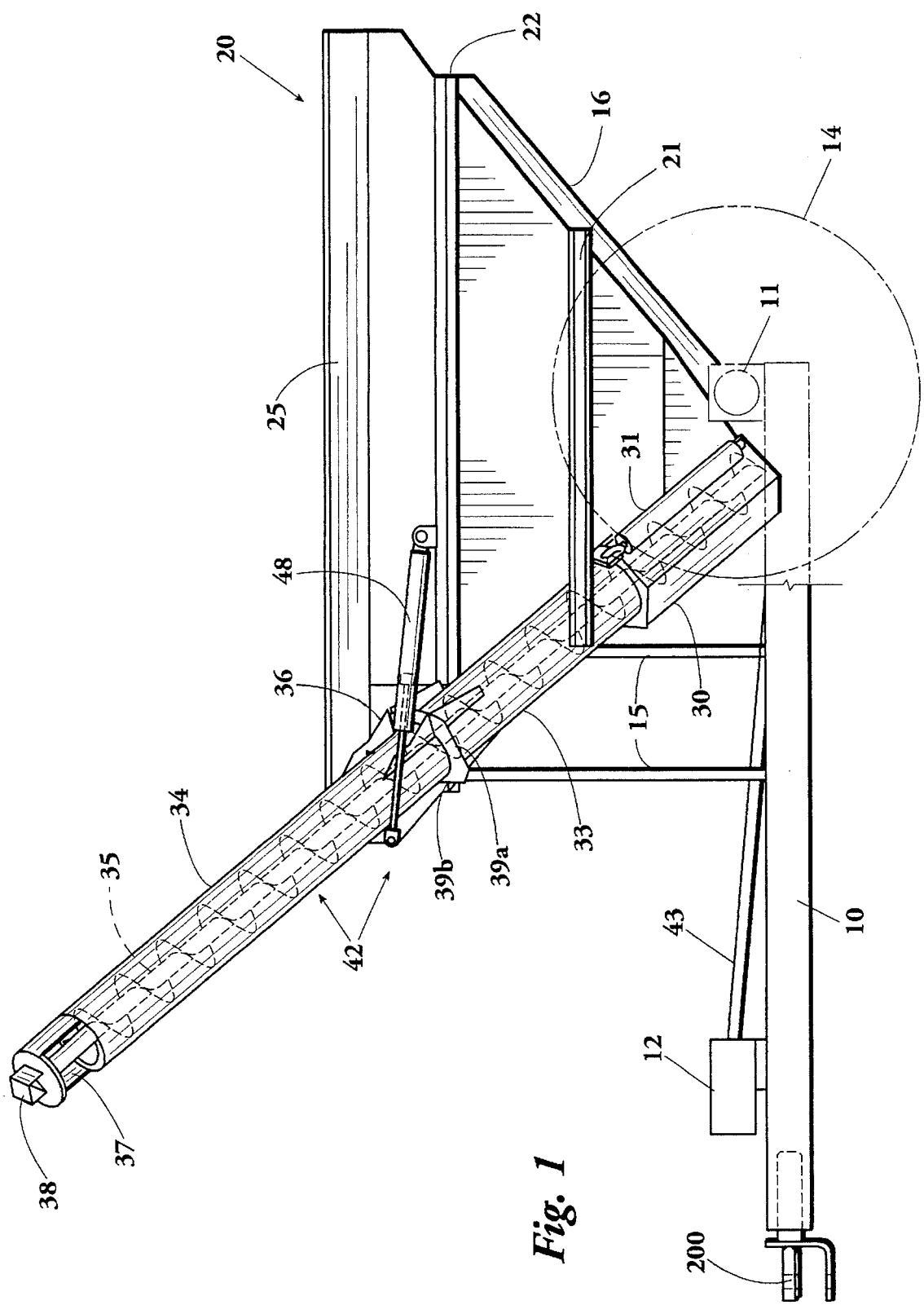
FIG. 1 is a side view of the preferred embodiment of the invention shown in its unload position.

Referring now to FIG. 1, Applicant's improved grain cart includes a frame 10. Frame 10 is provided with an axle assembly 11 and a plurality of wheels 14 (left wheel shown hidden). Frame 10 is thus adapted to be pulled by a vehicle, such as a tractor or heavy truck It should be understood that though frame 10 is shown to have a single axle mechanism, it could easily be provided with a dual or multi-axle mechanism or even a motorized track mechanism, all being known in the art.

A grain hopper or box 20 is supported upon frame 10 by a number of struts 15 and diagonal braces 16 for imparting stability and integrity. Hopper 20 is further provided with a lower waistband 21 and an upper waistband 22 for added support and strength. Shown affixed to and extending from the front left corner of hopper 20 is an auger means generally indicated by the numeral 42.

While the purpose of hopper 20 is to hold grain or other granular material loaded therein, the function of auger means 42 is to unload such material from hopper 20. Auger means 42 is entirely located outside of hopper 20. Auger means 42 includes a sump 30 for receiving grain from hopper 20, sump 30 being positioned on a lower, outside wall portion of hopper 20. A grain shut off door (not shown in FIG. 1) is provided for controlling a flow of grain from hopper 20 to sump 30. The grain shut off door is located between sump 30 and the surface of the outside wall portion of hopper 20. A first hydraulic cylinder 31 is mounted adjacent to sump 30 and is connected to the grain shut off door for opening and closing the door.

A conduit is connected to sump 30 to provide an enclosure for transporting grain from hopper 20 to a receptacle. Still referring to FIG. 1, the conduit preferably comprises a lower auger tube 33 connected to sump 30 at its first end and having a flange 39a at its second end. An upper auger tube 34 is mated to lower auger tube 33 by a hinge mechanism 36. Upper auger tube 34 has at its first end a flange 39b complimentary to that of lower auger tube flange 39a. Hinge mechanism 36 operates such that, when unfolded, upper auger tube 34 rests against upper box panel 25 of hopper 20. Hinge mechanism 36 is preferably controlled hydraulically utilizing the tractor's central hydraulic pump. A second hydraulic cylinder 48 connects beveled upper box panel 25 to upper auger tube 34.

At the terminal end of upper auger tube 34 is an outlet 37 and an end cap 38. Outlet 37 and end cap 38 function to control the flow of grain through the conduit and into the receptacle.

A means is supplied for conveying grain from hopper 20 through sump 30 and auger tubes 33, 34 and into the receptacle. As shown in FIG. 1, the preferred means is an auger fighting 35, also known as a helical auger. Other means, such as a paddle conveyer, would suffice. A gear box (not shown in FIG. 1) adapted to drive fighting 35 is situated under sump 30 and is connected by a universal joint to a drive shaft 43. Drive shaft 43 engages the gear box which, in turn, engages flighting 35. In FIG. 1 drive shaft 43 is shown without a safety cover. In operation, however, a safety cover should be attached. Drive shaft 43 runs from the gear box to a drive line assembly housed under motor cover 12. The drive line assembly is further described below.

Figure 2A:
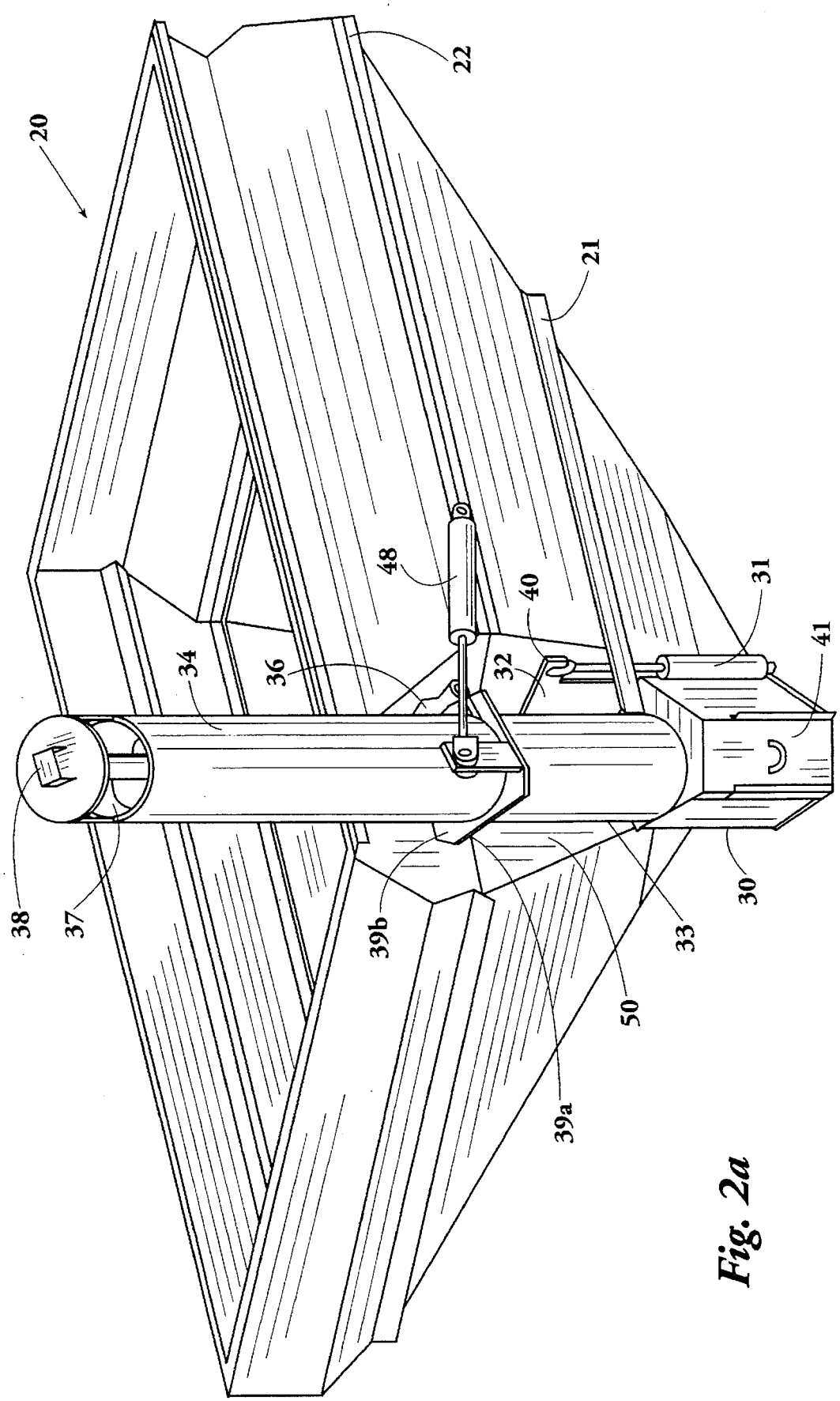
FIG. 2a is a perspective view of the hopper and auger means of the preferred embodiment of the invention.

Referring now to FIG. 2a, hopper 20 and auger means 42 are shown in a perspective view. From this view, it is evident that hopper 20 has an inset front corner area 50. In FIG. 2a, inset front corner area 50 is shown to be in the left front corner of hopper 20. This is the preferred location for the inset front corner area, as most tractor operators dismount on the left side and are more comfortable looking over their left shoulder to maneuver and monitor the grain cart. For purposes of this detailed description, the left and right sides of the cart are determined with reference to facing the direction of travel.

Figure 2B:
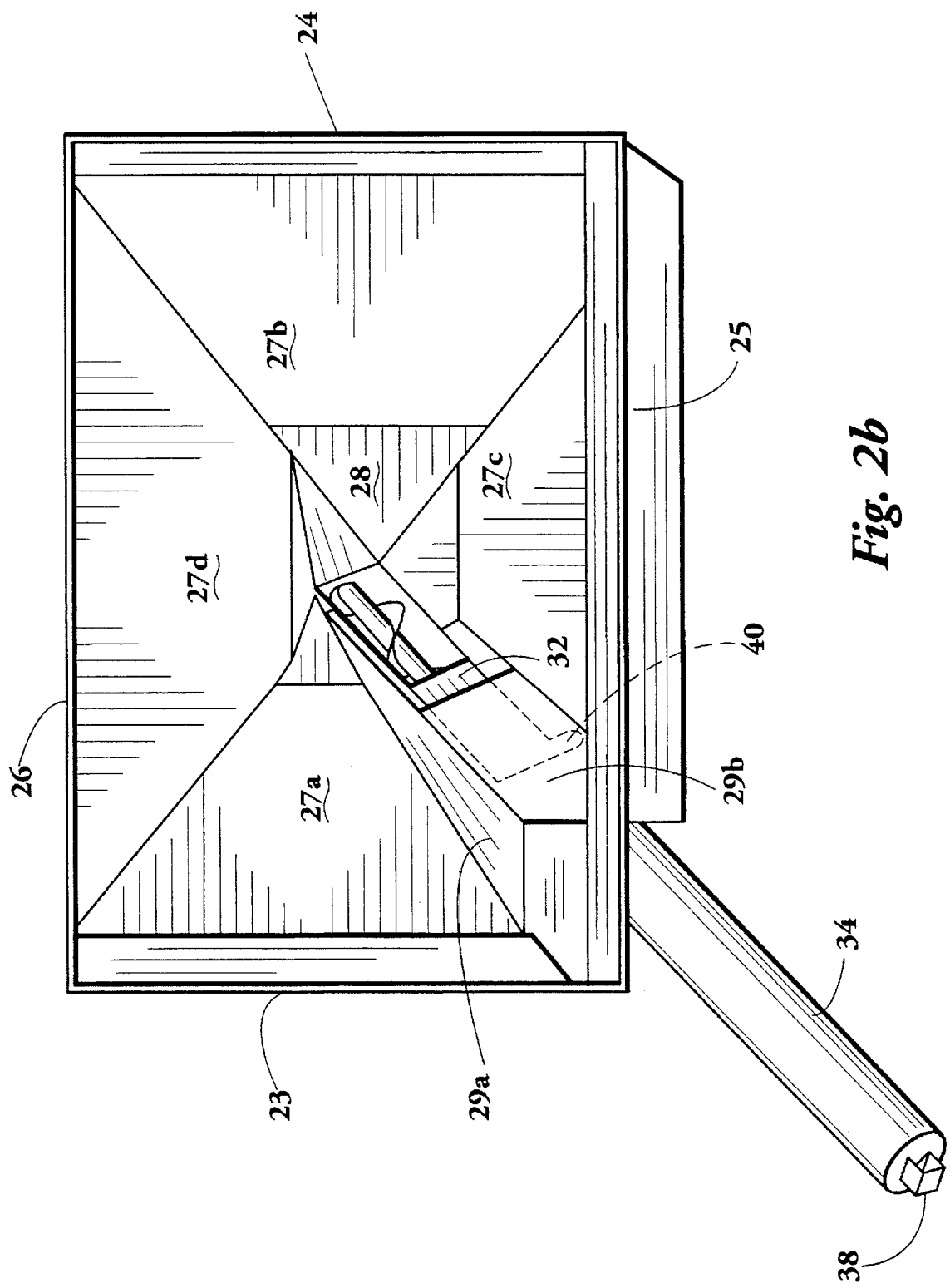
FIG. 2b is a top view of the same components.

Inset front corner area 50 is formed by the walls of hopper 20. This area can be better appreciated by understanding the construction of hopper 20 as shown collectively in FIGS. 2a and 2b. Hopper 20 is comprised of a front upper box panel 23, a rear upper box panel 24, and two side upper box panels 25, 26. While side upper panel 26 is vertically oriented, it is seen in FIG. 2b that side upper box panel 25 is of a beveled form. The beveled nature of side upper box panel 25 maximizes the cart width and gives upper auger tube 34 a resting place when the cart is in its transport position.

Upper box panels 23-26 form an open, rectangular top to hopper 20. Four large sloped sheets 27a–d make up the walls of hopper 20. The inner surfaces of sheets 27a–d slope convergingly toward the hopper bottom. A number of smaller cap sheets 28 are arranged at the hopper bottom to provide a smooth, clean hopper bottom surface. As further seen in FIG. 2b, two sloped sheets 29a, 29b, also known as auger cut-out sheets, define the interior surface of inset front corner area 50. Both auger cut-out sheets 29a, 29b are sloped convergingly toward the hopper bottom. Auger cut-out sheet 29b is shaped to have an opening complementary to the dimensions of grain shut off door 32.

Figure 5:
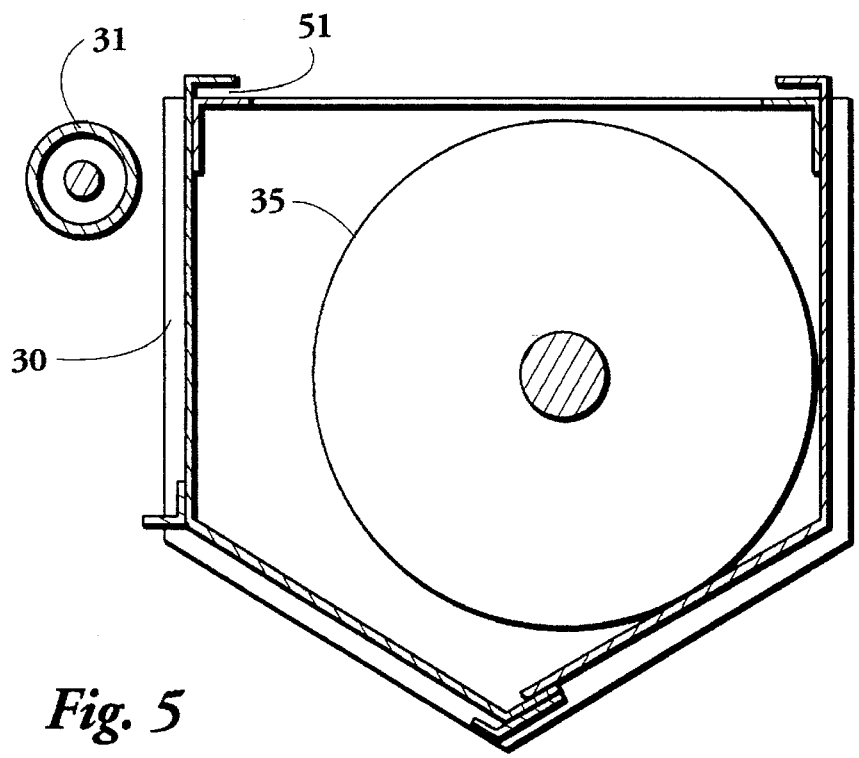
FIG. 5 is a view of the sump and flighting components of the invention taken along line 5—5 of FIG. 3.

FIG. 2a more clearly shows auger means 42 set within inset front corner area 50. Sump 30 is welded to a lower outside wall portion of inset front corner area 50. Two views of sump 30 and lower auger tube 33 prior to installation are shown in FIGS. 4a and 4b. In FIG. 4a, a top view, sump 30 is shown as provided with a grain shut off door opening 60 and an optional opening 61 for a pit dump door. Also shown is a pit door track mounting 65. FIG. 4b is a side view after attachment of sump 30 to the outside wall of inset front corner area 50. Both views show a gear box generally indicated by the reference numeral 70. A gear box shaft 72 connects gear box 70 to auger flighting 35. Auger flighting 35 is offset to one side of sump 30 as more particularly shown in FIGS. 5 and 6. Grain shut off door 32 is located between sump 30 and the surface of the outside wall portion of inset front corner area 50. The arrangement of grain shut off door 32 to sump 30 and the outside wall portion of inset front corner area 50 is more clearly shown in FIG. 5. FIG. 5 is a bottom view of the sump 30 and righting 35 components of the invention. As shown, there is a grain shut off door mounting space 51 provided between the outside wall portion of inset front corner area 50 and sump 30.

Grain shut off door 32 is provided with a tab 40 which is connected to first hydraulic cylinder 31. First hydraulic cylinder 31 is connected to the tractor's central hydraulic pump and is controlled from the cab of the tractor. First hydraulic cylinder 31 works to open or shut grain shut off door 32 as desired, and is mounted adjacent to sump 30 outside hopper 20. Sump 30 may also be provided with a pit dump door 41 to allow for the straight drop of grain from hopper 20 through sump 30 into a pit collection area.

Lower auger tube 33 is welded to sump 30 and extends to approximately the upper waistband 22 of hopper 20. The end of lower auger tube 33 connected to sump 30 is said to be a first end, while the end of lower auger tube 33 adjacent to hinge 36 is defined as a second end. On this second end, lower auger tube 33 is furnished with a flange 39a for mating with flange 39b of upper auger tube 34.

Figure 3:
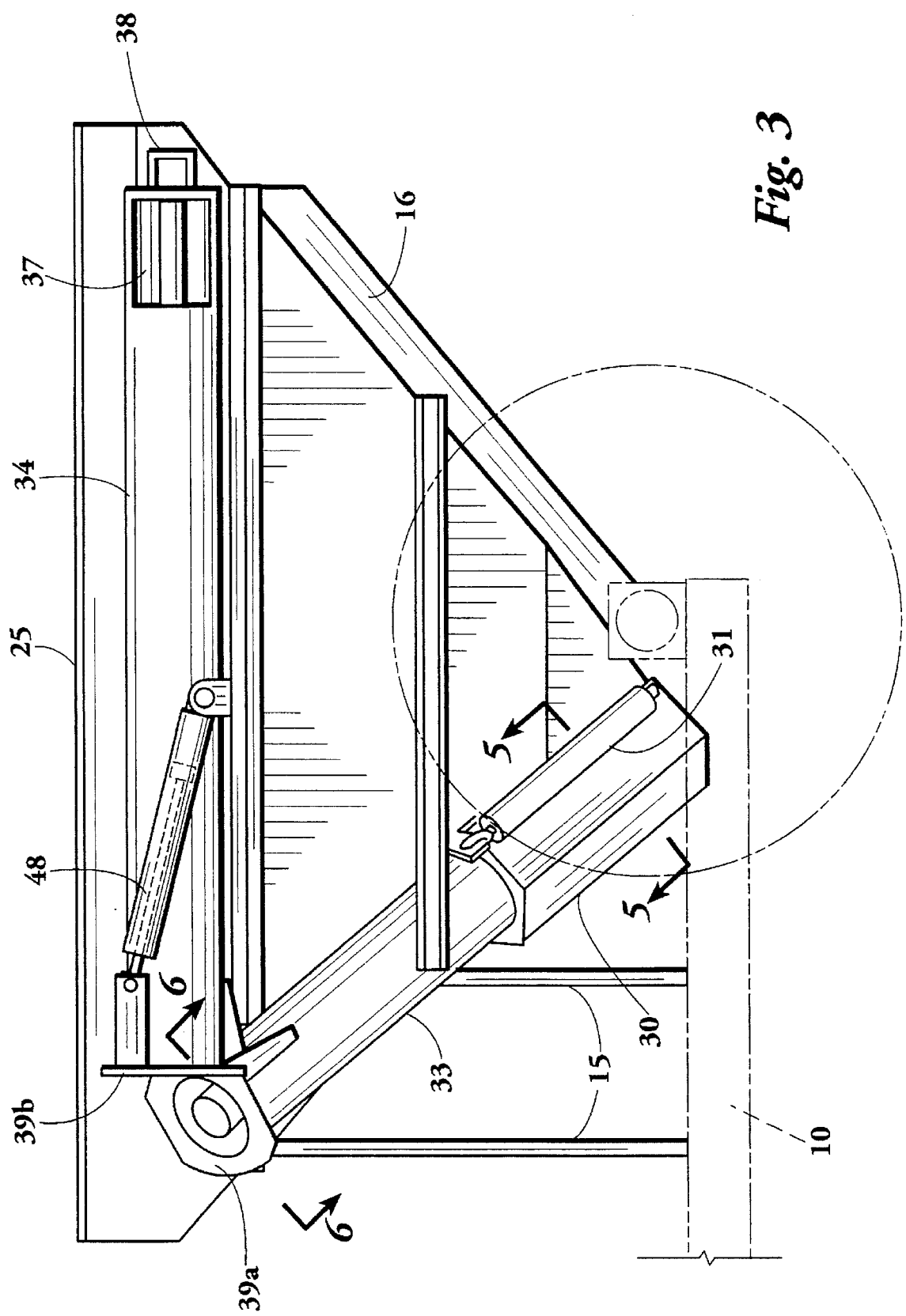
FIG. 3 is a side view of the preferred embodiment of the invention in its transport, or folded, position.

When the improved grain cart of the present invention is in its folded or transport position as shown in FIG. 3, upper auger tube flange 39b is distinctly visible by the tractor or vehicle operator. This allows the operator to quickly determine the position of upper auger robe 34 in relation to hopper 20. As previously mentioned, in its folded position upper auger tube 34 rests against beveled side upper box panel 25.

As a whole, auger means 42 is inclined about 50° with respect to frame 10. With this degree of inclination, auger means 42 is able to reach heights of discharge similar to conventional grain carts. Also, as shown in FIG. 3, upper auger tube 34 when resting does not extend beyond the rear of upper box panel 24.

Figure 6:
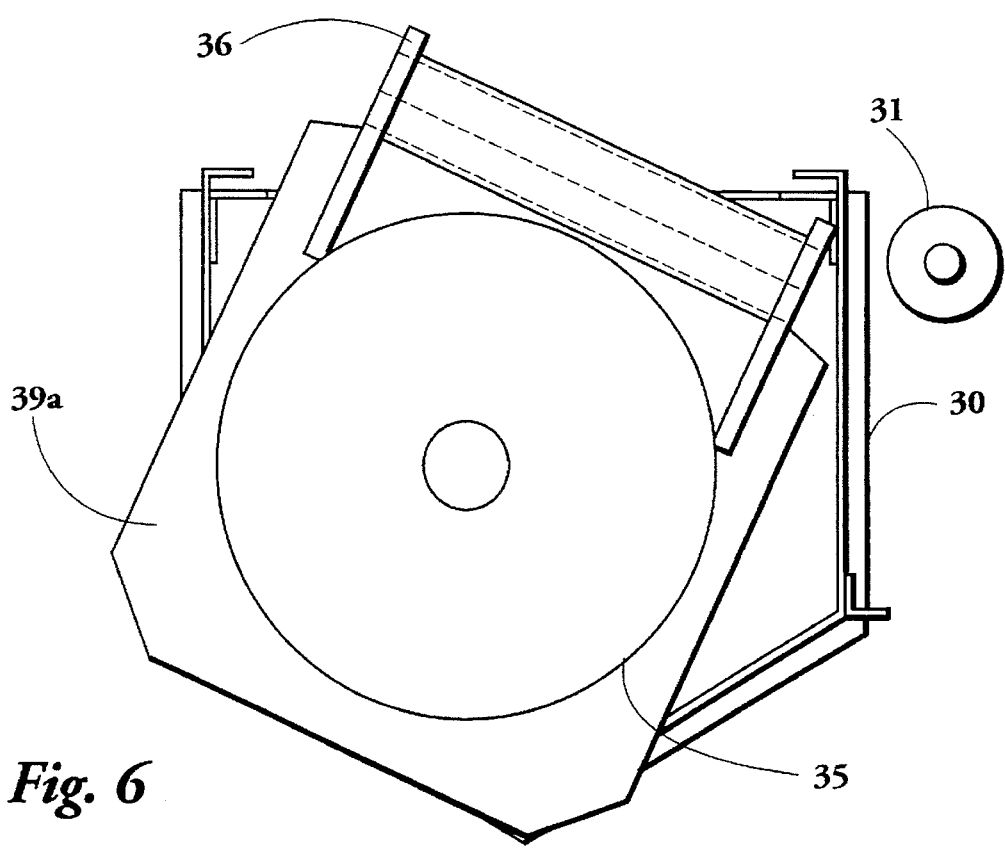
FIG. 6 is view of the lower auger flange, sump and flighting components of the invention taken along 6—6 FIG. 3.

FIG. 6 shows a view as if looking through lower auger tube 33 from flange 39a to sump 30. This view shows the spatial relationship of flange 39a to sump 30. This relationship allows for the working engagement of upper auger tube 34 to lower auger tube 33, while at the same time allowing for upper auger tube 34 to rest against side upper box panel 25 when in the transport position.

Figure 7:
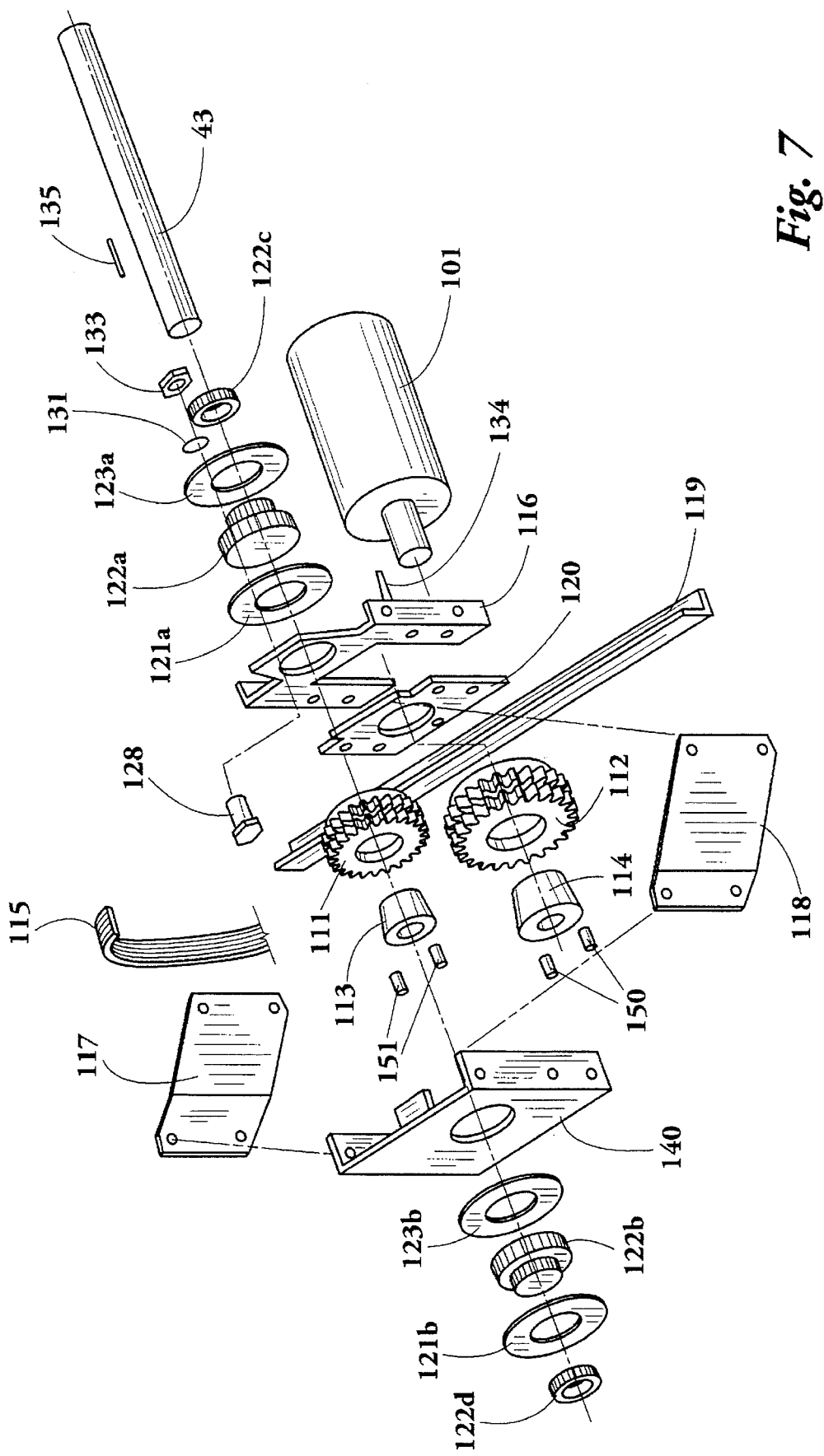
FIG. 7 is an exploded view of the components of the drive line assembly of the present invention.

FIG. 7 is a drive line assembly drawing showing the components of the auger flighting drive mechanism. Drive shaft 43 is connected to a universal joint (not shown) on gear box 70 (not shown in FIG. 7). A first bearing 122a and locking retaining collar 122c slide onto drive shaft 43 to about two feet from the front end of drive shaft 43. Two bearing flanges 121a, 123a sandwich first bearing 122a. Flange 121a contains a grease zert.

A motor and bearing mounting plate 116 is placed over drive shaft 43 forward of first bearing 122a. First bearing 122a and flanges 121a, 123a are bolted to mounting plate 116 with three bolts, lock washers and nuts, such as bolt 128, lock washer 131, and nut 133.

A hydraulic motor 101 is attached by four bolts to a motor mounting plate 120. Motor mounting plate 120 is then positioned in front of the motor and bearing mounting plate 116 where it is affixed thereto with four bolts.

A first sprocket 112 and a bushing 114 are assembled with two set screws 150. A drive key 134 is then inserted into the hydraulic motor shaft keyway. Thereafter, the sprocket assembly (112, 114) is arranged over the motor output shaft.

A second sprocket 111 is also assembled to a bushing 113 with two set screws 151. A drive key 135 is inserted into a keyway that is located approximately eight inches from the front end of drive shaft 43. The drive shaft sprocket assembly (111, 113) is mounted onto drive shaft 43 and key 135 with the set screws facing toward the front of the cart.

Figure 8B:
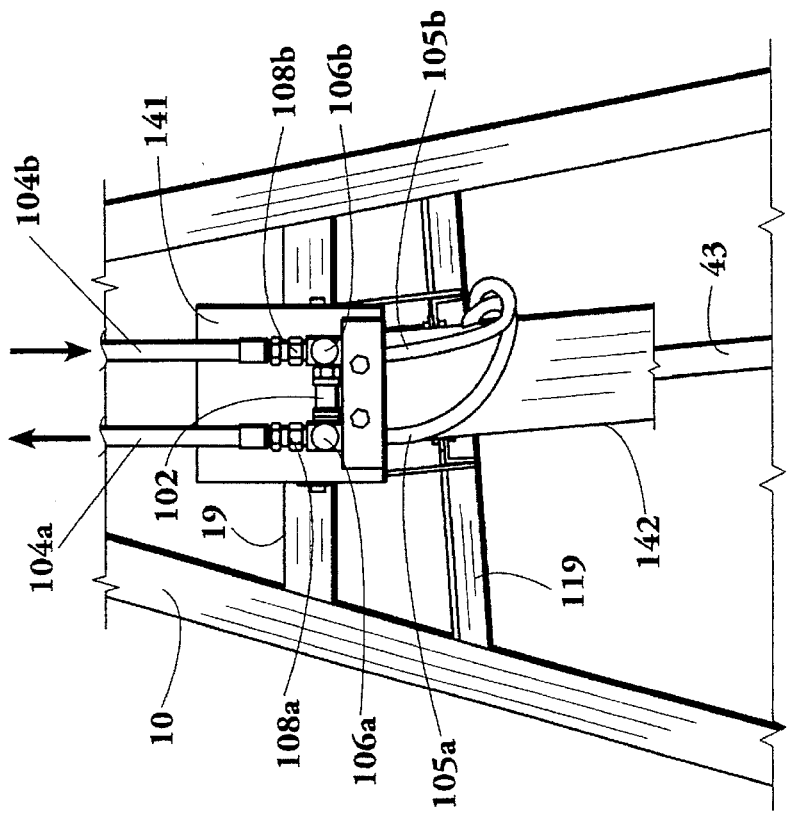
FIGS. 8a and 8b are plan views of the installed drive line assembly.
Figure 8A:
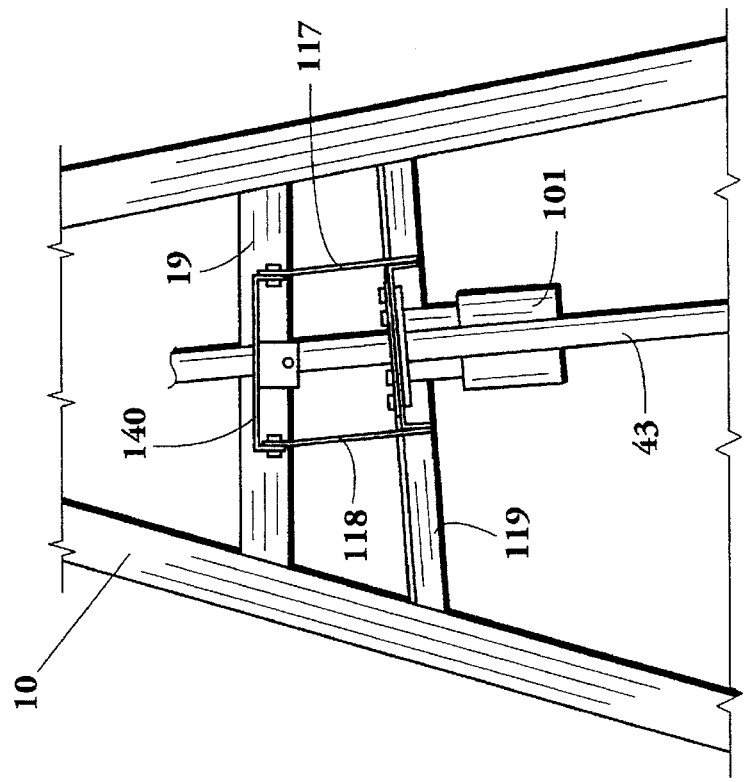

A front bearing mount 140 is attached to a drive assembly frame cross-member 19 as particularly shown in FIG. 8a. A second bearing 122b and locking collar 122d and flanges 121b, 123b are mounted against front bearing mount 140 with bolts, lock washers, and nuts. Bearing flange 121b also contains a grease zert.

Two side plates 117, 118 connect front bearing mount 140 to mounting plate 116. Left side plate 118 is slightly longer than fight side plate 117 to keep motor 101 in line with drive shaft 43.

Drive shaft sprocket 111 may be aligned with hydraulic motor sprocket 112 by sight. A chain 115 operatively connects drive shaft sprocket 111 with hydraulic motor sprocket 112. One or more of the sprockets 111, 112 are replaceable and hydraulic motor 101 is adjustably mounted such that the size of the sprockets 111, 112 and the chain 115 may be changed to vary the rotational velocity of the auger flighting.

An anti-rotation bar 119 is connected to the bottom two holes in mounting plate 116 between the frame channels with bolts, fiat washers, lock washers, and nuts. FIG. 8a helps to show the placement of the different assemblies used in the mounting of the drive Line components.

Turning now to FIG. 8b and a top view of the hydraulic components of the drive line assembly, a tee connector 106a–b is screwed into each end of a check valve 102. Check valve 102 insures that flighting 35 can be operated only in its forward direction. A 45° elbow 108a–b is installed into each tee connector 106a–b so that both elbows are aimed toward the front of the cart. The male ends of two hoses 104a–b are connected to elbows 108a–b.

Two O-ring connectors (not shown) are inserted into the ports on hydraulic motor 101. The male ends of two hoses 105a–b are attached to tee connectors 106a–b, and female swivel ends are then connected to hydraulic motor 101.

A front drive shaft guard 142 and a rear drive shaft guard (not shown) should be placed over drive shaft 43 for safety purposes. A clutch cover 141 is installed over front bearing mount 140. The check valve assembly 102 may then be clamped to the clutch cover 141 for added stability.

When the can is in its engaged hydraulic drive mode, fluid flows under pressure from the tractor's central hydraulic pump through hoses 104b, 105b and the associated hardware to operate hydraulic motor 101. The fluid flows back to the tractor's system from hydraulic motor 101 through return hoses 104a, 105a.

The cart is switched from hydraulic to PTO drive by removing chain 115 and coupling a PTO shaft to drive shaft 43. This is accomplished by loosening the four bolts located at motor mounting plate 120 so that hydraulic motor 101 may be raised to give slack to chain 115. After chain 115 has been removed, the four bolts in motor mounting plate 120 are retightened. The PTO shaft from the tractor is then attached to the forward end of drive shaft 43. Hydraulic hoses 104a–b should be tied out of the way so they do not interfere with the PTO shaft. To switch from PTO to hydraulic drive the above process is reversed.

FIGS. 1, 9a and 9b show a hitch 200 for use in connection with the improved grain cart disclosed herein. Hitch 200 may be generally described as a changeable cat/clevis hitch. Heretofore most grain carts were provided with either a single tang, or cat, hitch or a clevis hitch. The hitch may function as either a cat hitch or a clevis hitch.

FIG. 9a is a top view of the hitch. Hitch 200 includes a shaft 201 having a linkage hole 202 drilled therethrough at one end. At the other end of shaft 201 there is located a first hitch piece 203, referred to as an L-shaped washer hitch. Washer hitch 203 has a vertical portion with a countersunk area 206 for mating with shaft 201 and a horizontal portion having a linkage hole 207 therethrough. A second hitch piece 204, referred to as a cat hitch, is welded above and parallel to the horizontal portion of washer hitch 203 along the center axis of shaft 201 and in the middle of countersunk area 206 such that there is a space created between the cat hitch 204 and the horizontal portion of washer hitch 203. Cat hitch 204 is also provided with a linkage hole 208. A wear plate 205 is affixed to the bottom of cat hitch 204. Wear plate 205 is similarly provided with a linkage hole 209. Linkage holes 207–209 are aligned.

If the hitch is to be used as a cat hitch, a pin (not shown) of a length sufficient to couple cat hitch 204 alone is used. In other words, the pin should not be long enough to go through linkage hole 207. On the other hand, if the hitch is to be used as a clevis hitch, a pin of a length sufficient to pass through all linkage holes 207–209 should be used. Rather than changing hitches, an operator merely has to select the appropriate pin for use with the hitch mechanism.

In use, the tractor operator couples the tractor's drawbar or other hitch to hitch 13 of the grain cart, which is preferably the universal hitch. Either PTO or hydraulic drive is engaged, and the appropriate hydraulic connections are made between the tractor and hydraulic cylinders 31, 48. Grain shut off door 32 is closed. The grain cart is filled by a combine or other grain source and is moved, in its transport position, to an unloading area. There the grain conduit is unfolded by the action of second hydraulic cylinder 48 and hinge mechanism 36, and the grain is unloaded from hopper 20 by auger means 42. Flighting 35 is engaged by the drive line assembly, and first hydraulic cylinder 31 is made to open grain shut off door 32, thereby allowing a flow of grain to commence from hopper 20 into sump 30. The grain is conveyed through sump 30, auger tubes 33, 34 and outlet 37 into a receptacle. After hopper 20 is emptied, grain shut off door 32 is closed and hinge mechanism 36 is worked to cause upper auger tube 34 to fold and rest along beveled side upper box panel 25. The improved grain cart is then ready for transporting.

While the invention has been described with a certain degree of particularity, it is manifest that many changes may be made in the details of construction and the arrangement of components without departing from the spirit and scope of this disclosure. It is understood that the invention is not limited to the preferred embodiments set forth herein for purposes of exemplification, but is to be limited only by the scope of the attached claim or claims, including the full range of equivalency to which each element thereof is entitled.

What is claimed is:

1. An improved harvesting cart having a drive assembly for providing easy transition between PTO drive and hydraulic drive, said harvesting cart having a drive shaft for engaging an auger flighting, a forward end of said drive shaft being adapted to receive a complementary PTO coupling from a pulling vehicle, said drive assembly comprising:

(a) a first sprocket positioned upon said drive shaft at a generally forward location;

(b) a hydraulic motor mounted adjacent to said drive shaft and having an output shaft extending parallel to said drive shaft; and (c) a second sprocket positioned upon said output shaft of said hydraulic motor so as to be aligned in a working relationship to said first sprocket, such that said drive shaft may be either hydraulically-driven by said hydraulic motor via a chain operatively connecting said first sprocket with said second sprocket or PTO-driven by said pulling vehicle via said PTO coupling, said chain being easily installed and removed from about said first sprocket and said second sprocket by slightly adjusting the mounted position of said hydraulic motor so as to give slack to said chain.

2. The harvesting cart according to claim 1, further comprising a first bearing assembly positioned upon said drive shaft rearward of said first sprocket, said first bearing assembly being affixed to a motor/bearing mounting plate, and a second bearing assembly positioned upon said drive shaft forward of said first sprocket, said second bearing assembly being affixed to a front bearing mounting plate.

3. The harvesting cart according to claim 2, wherein said hydraulic motor is mounted to a motor mount, said motor mount in turn being mounted to said motor/bearing mounting plate, such that the mounted position of said hydraulic motor may be slightly adjusted by loosening said motor mount so as to give slack to said chain.

4. The harvesting cart according to claim 3, wherein said hydraulic motor is mounted to said motor mount with a plurality of nut and bolt assemblies and said motor mount is mounted to said motor/bearing mounting plate with a plurality of nut and bolt assemblies, such that by loosening said nut and bolt assemblies, the mounted position of said hydraulic motor may be slightly adjusted.

5. The harvesting cart according to claim 3, further comprising two side plates for connecting said front bearing mounting plate to said motor/bearing mounting plate so as to keep said hydraulic motor in line with said drive shaft.

6. The harvesting cart according to claim 5, further comprising an anti-rotation bar connected to said motor/bearing mounting plate.

7. The harvesting cart according to claim 1, wherein said first sprocket is positioned upon said drive shaft at about 2 feet from the forward end of said drive shaft.

8. An improved harvesting cart having a drive assembly for providing easy transition between PTO drive and hydraulic drive, said harvesting cart having a drive shaft for engaging an auger flighting, a forward end of said drive shaft being adapted to receive a complementary PTO coupling from a pulling vehicle, said drive assembly comprising:

(a) a first sprocket positioned upon said drive shaft at a generally forward location;

(b) a first bearing assembly positioned upon said drive shaft rearward of said first sprocket, said first bearing assembly being affixed to a motor/bearing mounting plate;

(c) a second bearing assembly positioned upon said drive shaft forward of said first sprocket, said second bearing assembly being affixed to a front bearing mounting plate;

(d) a hydraulic motor mounted adjacent to said drive shaft and having an output shaft extending parallel to said drive shaft, said hydraulic motor mounted to a motor mount, said motor mount in turn being mounted to said motor/bearing mounting plate; and (e) a second sprocket positioned upon said output shaft of said hydraulic motor so as to be aligned in a working relationship to said first sprocket, such that said drive shaft may be either hydraulically-driven by said hydraulic motor via a chain operatively connecting said first sprocket with said second sprocket or PTO-driven by said pulling vehicle via said PTO coupling, said chain being easily installed and removed from about said first sprocket and said second sprocket by slightly adjusting the mounted position of said hydraulic motor so as to give slack to said chain.

9. The harvesting cart according to claim 8, wherein said hydraulic motor is mounted to said motor mount with a plurality of nut and bolt assemblies and said motor mount is mounted to said motor/bearing mounting plate with a plurality of nut and bolt assemblies, such that by loosening said nut and bolt assemblies, the mounted position of said hydraulic motor may be slightly adjusted.

10. The harvesting cart according to claim 8, further comprising two side plates for connecting said front bearing mounting plate to said motor/bearing mounting plate so as to keep said hydraulic motor in line with said drive shaft.

11. The harvesting cart according to claim 8, further comprising an anti-rotation bar connected to said motor/bearing mounting plate.

12. The harvesting cart according to claim 8, wherein said first sprocket is positioned upon said drive shaft at about 2 feet from the forward end of said drive shaft.

\* \* \* \* \*